United States Patent
Barbosa et al.

(10) Patent No.: US 7,467,693 B2
(45) Date of Patent: Dec. 23, 2008

(54) DISC BRAKE PAD RETURN SPRING

(75) Inventors: Manuel Barbosa, Novi, MI (US); Charles T. Layton, Beverly Hills, MI (US); Muhammad Farooq Ansari, Farmington Hills, MI (US)

(73) Assignee: Akebono Corporation (North America), Elizabethtown, KY (US)

( * ) Notice: Subject to any disclaimer, the term of this patent is extended or adjusted under 35 U.S.C. 154(b) by 0 days.

(21) Appl. No.: 10/199,063

(22) Filed: Jul. 22, 2002

(65) Prior Publication Data

US 2003/0192749 A1    Oct. 16, 2003

Related U.S. Application Data

(60) Provisional application No. 60/371,127, filed on Apr. 10, 2002.

(51) Int. Cl.
*F16D 55/22* (2006.01)

(52) U.S. Cl. .................................. 188/72.3; 188/73.38

(58) Field of Classification Search ................ 188/72.3, 188/73.36, 73.37, 73.38
See application file for complete search history.

(56) References Cited

U.S. PATENT DOCUMENTS

| | | | |
|---|---|---|---|
| 4,666,025 A | 5/1987 | Rubin | |
| 4,940,119 A | 7/1990 | Kondo | |
| 5,249,647 A | 10/1993 | Kobayashi et al. | |
| 5,251,727 A * | 10/1993 | Loeffler et al. | 188/73.38 |
| 5,310,024 A | 5/1994 | Takagi | |
| 5,511,638 A | 4/1996 | Tsuruta | |
| 5,538,103 A * | 7/1996 | Rueckert et al. | 188/72.3 |
| 5,549,181 A * | 8/1996 | Evans | 188/72.3 |
| 5,829,555 A * | 11/1998 | Anda et al. | 188/73.38 |
| 5,881,848 A | 3/1999 | Mery et al. | |
| 5,934,417 A * | 8/1999 | Kobayashi et al. | 188/72.3 |
| 6,179,095 B1 | 1/2001 | Weiler et al. | |
| 6,378,665 B1 * | 4/2002 | McCormick et al. | 188/72.3 |

FOREIGN PATENT DOCUMENTS

| | | |
|---|---|---|
| DE | 4304616 | 8/1994 |
| EP | 04277333 | 10/1992 |
| EP | 07280004 | 10/1995 |
| JP | 58-60032 | 4/1983 |
| JP | 08-128475 | * 5/1996 |
| JP | 08-145089 | * 6/1996 |

* cited by examiner

*Primary Examiner*—Bradley T King
(74) *Attorney, Agent, or Firm*—Dobrusin & Thennisch PC

(57) ABSTRACT

A disc brake return spring comprises a V-shaped spring having two spring members, with each member ending in an engagement leg. Each engagement leg is angled with respect to the spring legs in a fashion so that the spring applies a moment to the friction pad to counteract rotation that occurs about the backing plate supports. The return spring is employed in a disc brake assembly having friction pads with backing plates that are disposed on either side of a rotor for braking purposes.

20 Claims, 2 Drawing Sheets

DISC BRAKE PAD RETURN SPRING

CROSS REFERENCE TO RELATED APPLICATION

This application claims the benefit of U.S. Provisional Application Ser. No. 60/371,127, which was filed on Apr. 10, 2002.

FIELD OF THE INVENTION

The present invention is directed to a return spring for pads in a disc brake system and, in particular, to a return spring with engagement legs that apply a torque to maintain the pads generally parallel to the rotor when in a non-braking state.

BACKGROUND ART

In disc brake systems, it is common to employ return springs that return the disc brake pads to a rest position after braking. These springs come in a variety of shapes, including v-shapes. Typically, the ends of the springs engage the upper parts of the backing plates that support the brake, or friction pads. FIG. 1 is a partial top view 10 of a typical disc brake assembly wherein a v-shaped spring 1 is positioned between backing plates 3 that support friction pads 5. The v-shaped spring 1 exerts an outward force "F" on the pads 5 to urge each pad 5 away from respective outer surfaces 8 of the rotor 7, thus preventing drag, excessive pad wear, and excessive rotor wear during the non-braking condition.

FIG. 2 illustrates the spring 1 in a typical installation and shows one of two opposed ears 9 that are commonly used to carry the backing plate. The ears 9 ride in a recess 12 in the mounting member 14. Engagement legs 11 at the end of each spring member 13 engage openings 15 in the backing plates 3. As shown in FIG. 4, the engagement legs 11 are perpendicular to the spring member 13. When positioned in the opening 15 in the backing plate 3 (see FIG. 3) the engagement leg 11 is generally parallel to the opposing sides of the opening 15.

FIG. 5 illustrates a problem created by the return spring shown in FIGS. 1-4. The forces applied by the spring 13 to the upper parts of the backing plates 3 create a torque that rotates the pads about the ears 9 when the system is in a non-braking state. Thus, the plates 3 rotate about a longitudinal axis "M" of the plate (see FIG. 2) that extends in a tangential direction (with respect to the brake rotor) between the ears 9, which causes the pads 5 to assume a non-parallel configuration with respect to the rotor 7, whereby the bottoms of the pads often contact the rotor 7 in the areas 16 resulting in uneven pad wear and excessive drag.

Accordingly, a need exists to reduce or eliminate the uneven wear and drag that result from the configuration shown in FIG. 5 to increase friction pad and rotor life. The invention responds to this need by providing a uniquely configured disc brake pad return spring that applies a force urging the pads away from the rotor and also applies a twisting force that prevents the rotation about the backing plate ears normally caused by the return spring force.

SUMMARY OF THE INVENTION

It is a first object of the present invention to provide an improved disc brake pad return spring.

Another object of the invention is to provide a disc brake pad return spring that not only urges the pads away from the rotor in the non-braking state but also maintains a parallel alignment between the pads and the rotor.

Yet another object of the invention is to provide an improved disc brake assembly that utilizes the inventive disc brake return spring.

A further object is to provide a method of maintaining friction pads in a generally parallel orientation with respect to a rotor when in a non-braking state by inducing a first moment that opposes the moment induced in the backing plate by the return spring.

Other objects and advantages of the present invention will become apparent as a description thereof proceeds.

In satisfaction of the foregoing objects and advantages, the invention includes a disc brake pad return spring, the spring in combination with a disc brake assembly, and a method of counteracting the torque or rotation that is caused by the return spring when the brake pads are in the non-braking state.

The return spring of the invention is configured such that it applies a torque that counteracts the torque normally created by application of the return force to the backing plate at a location displaced from a longitudinal axis that extends between the mounting ears. The invention will be described with regard to the preferred embodiment, but it will be appreciated that other configurations are possible that will apply forces and moments equivalent to those applied by the preferred embodiment.

In the preferred embodiment, the return spring comprises a pair of spring members that together form a v-shape, and each spring member terminates in an engagement leg that extends at an angle to the respective spring leg such that the two legs diverge from each other. The engagement legs are received in holes in the backing plates in such a manner that the desired torque is applied to the backing plate.

In the preferred embodiment, the two engagement legs lie in a plane transverse to a plane containing the spring members. The engagement legs are not parallel, however, and diverge at an angle that will place the spring members in torsion and apply a desired moment to each backing plate when engaged therewith. The plane containing the engagement ends may be perpendicular to the plane containing the spring members or not. Further, the spring may be symmetrical or not.

The return spring also forms part of a brake pad assembly that includes a pair of friction pads mounted to a pair of backing plates, and a rotor. Each engagement leg is positioned in a respective hole in a backing plate of the assembly so that the spring legs force the friction pads away from the rotors when in a non-braking state.

The inventive return spring applies a torque to maintain the pair of friction pads mounted on their respective backing plates generally parallel to the rotor when in a non-braking condition. By its configuration and when in use in the brake assembly, the return spring applies a linear outward force at a top portion of backing plates. At the same time and due to the twist applied to the spring members by the angular relationship of the engagement legs, the engagement legs induce a moment at the top portion of the backing plates. This moment counteracts the moment that is induced in the backing plates ears as a result of the application of the return force at a location spaced from the axis of the support ears.

BRIEF DESCRIPTION OF THE DRAWINGS

Reference is now made to the drawings of the invention wherein.

DESCRIPTION OF THE PREFERRED EMBODIMENTS

The present invention offers significant improvements in the operation of disc brake assemblies and longevity of brake components such as friction pads and rotors. Unlike many prior art disc brake assemblies, use of the inventive disc brake return spring maintains the friction pads in a generally parallel relationship with the rotor when at rest and in a non-braking state. Consequently, unwanted contact between the pads and rotors in the non-braking condition is eliminated or at least drastically reduced.

Figure 1:
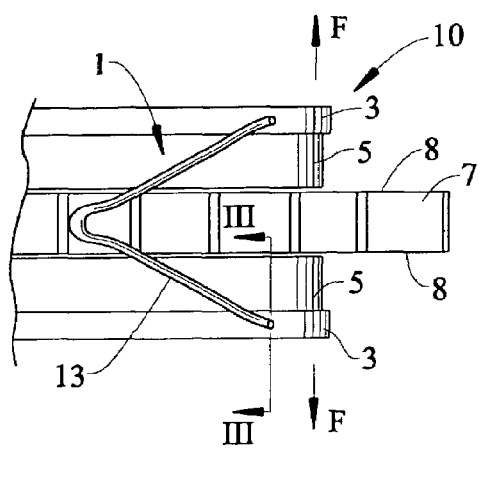
FIG. 1 is a partial top view of a prior art disc brake assembly at rest.
Figure 2:
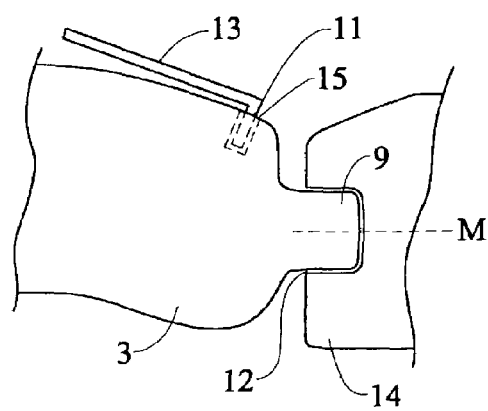
FIG. 2 is a partial side view of the assembly of FIG. 1.
Figure 3:
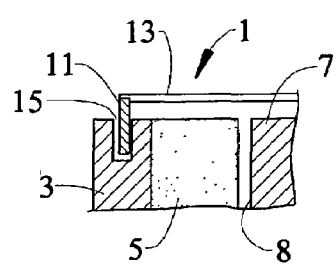
FIG. 3 is a cross-sectional view along the line III-III of FIG. 2.
Figure 4:
FIG. 4 is an open end view of the return spring of FIG. 1.
Figure 5:
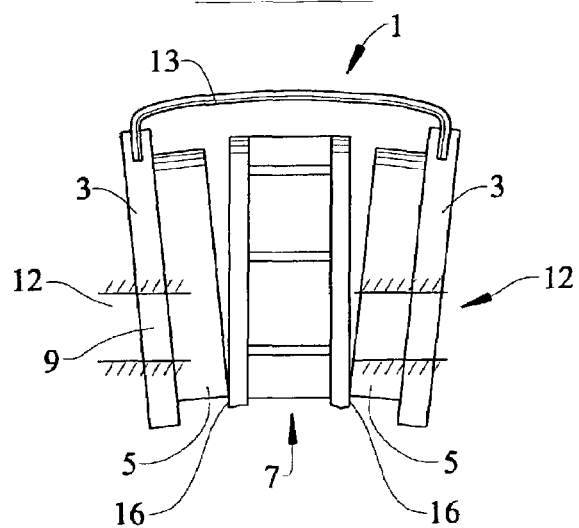
FIG. 5 is an end view of the assembly of FIG. 1.
Figure 6:
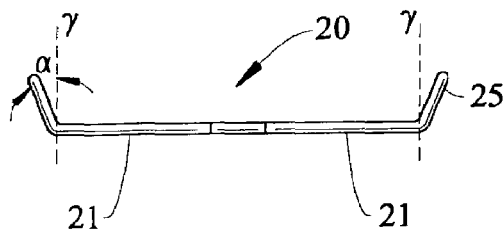
FIG. 6 is an end view of one embodiment of the return spring of the invention.
Figure 7:
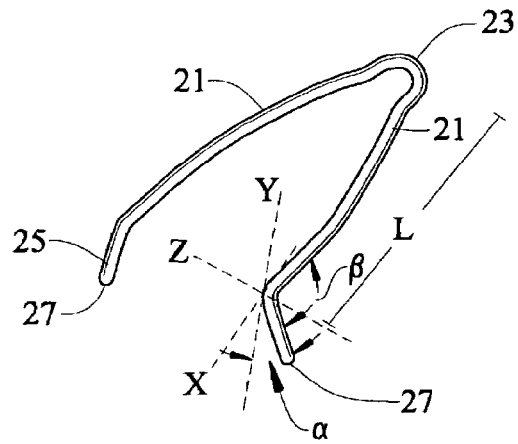
FIG. 7 is a perspective view of the spring of FIG. 6.

Referring now to FIGS. 6-9, one embodiment of the inventive return spring is designated by the reference numeral 20 and includes a pair of spring members 21 that are joined by a connector portion 23. Each spring member terminates in an engagement leg 25 with a free end 27. Each engagement leg 25 is bent outward to form an angle $\alpha$ as shown in FIGS. 6 and 7, measured in a plane containing the two engagement legs and with respect to a line perpendicular to the plane containing the two spring members 21. It will be appreciated that the engagement legs 11 of the prior art design of FIG. 3 are parallel, whereas those of the invention diverge. Each leg 25 and its adjacent spring member 21 lie in a plane, and the leg 25 forms an angle $\beta$ in that plane (see FIG. 7) that may be more than 90°.

The orientation of the engagement legs 25 may be defined with respect to different reference lines, such as axes "fly" and "z" shown in FIG. 7, or a component of the brake assembly such as the rotor surface 8 or a wall of the opening 15 in the backing plate. The angle $\alpha$ is defined herein as lying in the plane containing both engagement legs, e.g., the plane formed by a "y" axis perpendicular to the plane containing the spring members and "z" axis lying in both the plane containing the spring members and the plane containing the engagement legs. The angle $\alpha$ is measured in the y-z plane from the y-axis. The directions of the engagement legs intersect in the y-z plane, and the "y" axis extends in the direction of the bisector of the angle of intersection. Thus, if the spring is symmetrical, the angle $\alpha$ is one half the angle of intersection.

Figure 8:
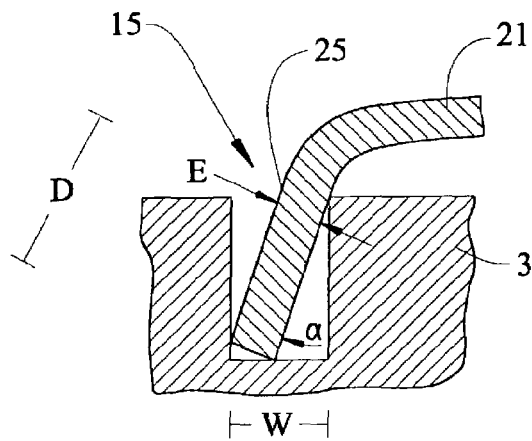
FIG. 8 is a partial cross-sectional view of the spring of FIG. 7 retained in a disc brake assembly.

FIG. 8 is an illustration of the engagement leg 25 received in opening 15 in one of the backing plates 3. Before being placed in the hole, the ends of the engagement legs are rotated toward each other to reduce the angles $\alpha$ and thereby apply a torque to each of the spring members. Thus, when engaged in the hole, the leg 25 assumes an angle $\alpha'$.

The angle $\alpha'$ is determined by the geometry of the hole and the engagement leg. If the diameter of the hole is the common 2.4 mm, the diameter of the spring member is the common 1.7 mm, and the length of the engagement leg is 5.4 mm, $\alpha'$ will be about 7.4°.

As in the prior art design, the spring members 21 apply a force to the backing plates through the legs 25 urging the backing plates 3 and the attached friction pads 5 away from the rotor 7. Because this force is applied at a distance from the longitudinal axis "M" formed by the ears of the backing plates, it generates a moment about that axis, tending to rotate the backing plate about the axis. The described orientation of the engagement legs 25, however, applies as twist to the spring members such that they apply to the backing plates an opposed twisting force, or moment that counteracts the rotation of the plates about the axis "M" caused by the restoring force of the return spring.

Figure 9:
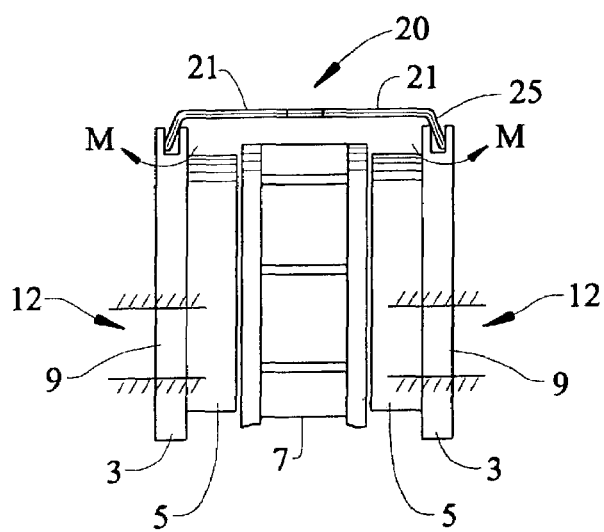
FIG. 9 shows an end view of the brake assembly referred to in FIG. 8 in the non-braking state.

FIG. 9 illustrates the advantages of the invention, wherein the friction pads 5 and plates 3 are in the at-rest state and are generally parallel to the rotor 7. Bending the legs 25 outwardly by angle $\alpha$ in the rest state (i.e., the free ends 27 diverge with respect to each other in the at -rest state, see FIGS. 6 and 7) causes the spring leg to act both as a spring to produce the outward linear force "F" and as a torsion spring along length "L" to induce a moment "M" (see FIG. 9) to the top of the backing plate. The dimensions of the spring leg 25 and opening 15 are sized such that this moment overcomes the moment resulting from application of the spring return force to the top of the pad on the one hand and the frictional resistance to sliding of the ears on the other. Thus, the torsion applied by the legs 25 force the bottom of the pad to slide away from the rotor 7 to provide clearance between the rotor 7 and the pads 5 in the parallel orientation shown in FIG. 9.

In one design for commonly used spring materials, the angle $\alpha$ is about 15° so that each of the spring members is subjected to a torsion pre-load of about 8° to thereby apply the desired moment of about 1.7 in.-lbs. to each of the brake pads. This is only an illustration, however, and depends on such factors as the modulus of elasticity and spring constant of the material, and the diameter of the spring. In general, once the magnitude of the desired moment is determined and the spring material known, the required angular displacement $\alpha$ can be calculated. Depending on the particular materials and dimensions, the desired angle may be in the range of from 10° to 30°.

While the v-shaped spring is shown with a simple v-shape via the connector portion 23, other shapes could be employed for the spring members 21, such as a double V-shape as disclosed in JP-56-21633, or other curved shapes as would be within the skill of the art. In addition, the spring 20 can be made from any conventional spring material. Further, it can have a circular cross section, or any other cross sectional shape as would be within the skill of the art.

The connection between the spring and the backing plate may vary also and is not limited to the preferred engagement shown. For example, the engagement leg may be differently configured, and the backing plate could include a protrusion received in a recess in the spring, or the spring could be attached to the backing plate by another connector such as a threaded screw, or the like.

As such, an invention has been disclosed in terms of preferred embodiments thereof, which fulfill each and every one of the objects of the present invention as set forth above and provides new and improved disc brake return spring as well as a disc brake assembly employing the spring.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. In a brake pad assembly comprising a pair of friction pads mounted on a pair of backing plates, a rotor, and a brake pad return spring having a pair of spring members, each spring member terminating in an engagement leg, each engagement leg engaging a respective backing plate to apply a restoring force to urge the friction pads away from the rotor in a non-braking state, the improvement wherein the rest orientation of each of said engagement legs is such that each of said engagement legs must be rotated from said rest position to engage said respective backing plate, each respective spring member being thereby placed in torsion to apply a first moment to said respective backing plate about a longitudinal axis of said respective backing plate that counteracts a moment in each said respective backing plate caused by application of said restoring force, wherein at rest said engagement legs are coplanar, non-parallel and diverge along directions that intersect, and each leg forms an acute angle with respect to the bisector of the angle of intersection, wherein each said engagement leg is received in a respective opening having a diameter larger than that of said each engagement leg, wherein upon engagement of the engagement leg with the backing plate the opening for receiving the engagement leg includes an axis that is non-parallel to an axis of the engagement leg.

2. The assembly of claim 1, wherein said engagement legs diverge from each other when at rest and each applies a torque to a respective spring member when engaged in a said backing plate.

3. The assembly of claim 1, wherein the brake pad return spring maintains parallel alignment between the pair of friction pads and the rotor.

4. The assembly of claim 1, wherein upon engagement of the engagement legs with the backing plate the engagement legs extend outwardly with respect to the rotor.

5. The assembly of claim 1, wherein the first moment is generated on an upper portion of the backing plate.

6. The assembly of claim 5, wherein the first moment is generated above engagement between the backing plate and a mounting member for the brake pad assembly.

7. The assembly of claim 1, wherein the opening is formed in the backing plate.

8. In a brake pad assembly comprising a pair of friction pads mounted on a pair of backing plates, a rotor, and a brake ad return spring having a pair of spring members, each spring member terminating in an engagement leg, each engagement leg engaging a respective backing plate to apply a restoring force to urge the friction pads away from the rotor in a non-braking state, the improvement wherein the rest orientation of each of said engagement legs is such that each of said engagement legs must be rotated from said rest position to engage said respective backing plate, each respective spring member being thereby placed in torsion to apply a first moment to said respective backing plate about a longitudinal axis of said respective backing plate that counteracts a moment in each said respective backing plate caused by application of said restoring force, wherein at rest said engagement legs are coplanar, non-parallel and diverge along directions that intersect, and each leg forms an acute angle with respect to the bisector of the angle of intersection, wherein each said engagement lea is received in a respective opening having a diameter larger than that of said each engagement leg.

wherein upon engagement of the engagement leg with the backing plate the engagement legs extend in a direction non-parallel to the rotor and the backing plate.

9. The assembly of claim 8, wherein said engagement legs diverge from each other when at rest and each applies a torque to a respective spring member when engaged in a said backing plate.

10. The assembly of claim 8, wherein the opening is formed in the backing plate.

11. The assembly of claim 8, wherein upon engagement of the engagement legs with the backing plate the engagement legs extend outwardly with respect to the rotor.

12. In a brake ad assembly comprising a pair of friction pads mounted on a pair of backing plates, a rotor, and a brake pad return spring having a pair of spring members, each spring member terminating in an engagement leg, each engagement leg engaging a respective backing plate to apply a restoring force to urge the friction pads away from the rotor in a non-braking state, the improvement wherein the rest orientation of each of said engagement legs is such that each of said engagement legs must be rotated from said rest position to engage said respective backing plate, each respective spring member being thereby placed in torsion to apply a first moment to said respective backing plate about a longitudinal axis of said respective backing plate that counteracts a moment in each said respective backing plate caused by application of said restoring force, wherein at rest said engagement legs are coplanar, non-parallel and diverge along directions that intersect, and each leg forms an acute angle with respect to the bisector of the angle of intersection, wherein each said engagement leg is received in a respective opening having a diameter larger than that of said each engagement leg, wherein the opening extends only in a top portion of the backing plate.

13. The assembly of claim 12, wherein said engagement legs diverge from each other when at rest and each applies a torque to a respective spring member when engaged in a said backing plate.

14. The assembly of claim 12, wherein the opening is formed in the backing plate.

15. The assembly of claim 12, wherein upon engagement of the engagement legs with the backing plate the engagement legs extend outwardly with respect to the rotor.

16. A method of maintaining a pair of friction pads in a disc brake assembly generally parallel to each other in a non braking condition, wherein each pad is mounted on a respective backing plate and each backing plate has supporting ears that engage said disc brake assembly, said method comprising the steps of:

providing a return spring comprising a pair of elongate spring members arranged to move toward and away from each other in a first direction and to provide a restoring force in said first direction, and a pair of engagement legs, each engagement leg being formed on a respective one of said spring members and configured to engage a respective brake ad backing plate, wherein before engaging a respective said brake pad said pair of engagement lens are coplanar and non-parallel, and each of said engagement legs must be rotated to engage said respective backing plate when said respective backing plate is installed in a brake assembly, and each respective spring member is thereby placed in torsion to apply a first moment to each said backing plate about a longitudinal axis of said backing plate that counteracts a moment in each said backing plate caused by application of said restoring force, and attaching said return spring to each said backing plate to apply a linear outward force to each of said backing plates at a location displaced from said ears, and apply a first moment to said backing plates to counteract a second moment resulting from application of said linear force wherein the linear force is applied and the first moment is induced by a pair of engagement legs of a spring, each engagement leg being oriented with respect to an adjacent spring member for applying the linear outward force, and free ends of the engagement legs applying the first moment, wherein during engagement of the return spring with the backing plate the engagement legs are placed in an opening formed in the backing plate, wherein upon engagement of the engagement leg with the backing plate the opening for receiving the engagement leg includes an axis that is non-parallel to an axis of the engagement leg.

17. The method of claim 16, wherein the brake pad return spring maintains parallel alignment between the pair of friction pads and the rotor.

18. The method of claim 16, wherein upon engagement of the engagement legs with the backing plate the engagement legs extend outwardly with respect to the rotor.

19. The method of claim 16, wherein the first moment is generated on an upper portion of the backing plate.

20. The method of claim 16, wherein each of said pair of engagement legs of a spring is received in respective openings in the backing plates.

* * * * *

UNITED STATES PATENT AND TRADEMARK OFFICE
CERTIFICATE OF CORRECTION

PATENT NO.       : 7,467,693 B2                                    Page 1 of 1
APPLICATION NO.  : 10/199063
DATED            : December 23, 2008
INVENTOR(S)      : Manuel Barbosa et al.

It is certified that error appears in the above-identified patent and that said Letters Patent is hereby corrected as shown below:

Column 5, Claim 8, Line 44, "ad" should be "pad"
Column 5, Claim 8, Line 62, "lea" should be "leg"
Column 6, Claim 12, Line 10, "ad" should be "pad"
Column 6, Claim 16, Line 55, "ad" should be "pad"

Signed and Sealed this

Seventeenth Day of February, 2009

JOHN DOLL
*Acting Director of the United States Patent and Trademark Office*